US012735264B2

(12) United States Patent
Löhr et al.

(10) Patent No.: US 12,735,264 B2
(45) Date of Patent: Sep. 15, 2026

(54) MATERIAL PROCESSING DEVICE AND METHOD FOR ADJUSTING A CONVEYOR DEVICE OF A MATERIAL PROCESSING DEVICE

(71) Applicant: Kleemann GmbH, Göppingen (DE)

(72) Inventors: Felix Löhr, Welzheim (DE); Christian Weller, Esslingen (DE); Wolfgang Schmid, Rechberghausen (DE)

(73) Assignee: Kleeman GmbH, Göppingen (DE)

( * ) Notice: Subject to any disclaimer, the term of this patent is extended or adjusted under 35 U.S.C. 154(b) by 299 days.

(21) Appl. No.: 18/486,404

(22) Filed: Oct. 13, 2023

(65) Prior Publication Data

US 2024/0140719 A1 May 2, 2024

(30) Foreign Application Priority Data

Oct. 28, 2022 (DE) ..................... 10 2022 128 781.5

(51) Int. Cl.

*B65G 21/14* (2006.01)
*B02C 21/02* (2006.01)
*B65G 41/00* (2006.01)

(52) U.S. Cl.

CPC ........... *B65G 21/14* (2013.01); *B65G 41/002* (2013.01)

(58) Field of Classification Search

None

See application file for complete search history.

(56) References Cited

U.S. PATENT DOCUMENTS 3,841,464 A * 10/1974 Tome .................... B02C 21/026 198/861.2
4,523,669 A * 6/1985 Smith .................... B65G 21/14 198/313

(Continued)

FOREIGN PATENT DOCUMENTS

DE 102009003005 A1 1/2010
WO WO-9737777 A1 * 10/1997 ............. B07B 13/16
WO WO-2019076488 A1 * 4/2019 ........... B65G 41/008

OTHER PUBLICATIONS

European Search Report for corresponding patent application No. 23199175.3. dated Mar. 6, 2024, 8 pages (not prior art).

(Continued)

*Primary Examiner* — Gene O Crawford
*Assistant Examiner* — Muhammad Awais
(74) *Attorney, Agent, or Firm* — Lucian Wayne Beavers; Patterson Intellectual Property Law, PC

(57) ABSTRACT

The invention relates to a material processing device (1), in particular a mobile material processing device (1), having a conveyor device (10), in particular a conveyor belt, for conveying processed material and/or material to be processed in a direction of conveyance (FR) between a pick-up area (13) and a discharge area (16) of the conveyor device (10), wherein the conveyor device (10) has a first and a second conveying area (11, 12), wherein the first conveying area (11) is coupled to the material processing device (1) in the area of a first connection (15) such that it can swivel about a first joint having a first swivel axis (15.1), wherein the first conveying area (11) and the second conveying area (12) are interconnected by means of a second joint having a second swivel axis (25), wherein the second conveying area (12) is connected to a tension means (30) by means of a third joint in the area of a second connection (17), and wherein the first, the second and the third joint form parts of a joint (Continued)

mechanism. The invention also relates to a method for adjusting a conveyor device (10) of a material processing device (1).

16 Claims, 4 Drawing Sheets

(56) References Cited

U.S. PATENT DOCUMENTS

| | | | | |
|---|---|---|---|---|
| 8,113,332 | B2 | 2/2012 | Devlin et al. | |
| 8,136,670 | B2 * | 3/2012 | Garland | B07B 11/06 209/365.2 |
| 9,586,764 | B2 * | 3/2017 | Salminen | B65G 21/12 |
| 2003/0047415 | A1 * | 3/2003 | Wagstaffe | B02C 21/02 198/313 |
| 2006/0180436 | A1 * | 8/2006 | Heeszel | B65G 41/008 198/587 |
| 2009/0308718 | A1 * | 12/2009 | Devlin | B07B 1/005 198/861.2 |
| 2010/0282568 | A1 * | 11/2010 | Whyte | B02C 21/026 198/313 |
| 2014/0202835 | A1 * | 7/2014 | Watters | B65G 21/12 198/812 |
| 2014/0224906 | A1 * | 8/2014 | Dunn | B02C 21/026 209/241 |
| 2018/0050872 | A1 * | 2/2018 | Weller | B65G 41/002 |
| 2020/0384504 | A1 * | 12/2020 | Rafferty | B07B 1/34 |
| 2021/0299674 | A1 * | 9/2021 | Narayanaswamy | B02C 21/02 |

OTHER PUBLICATIONS

German Office Action for corresponding patent application No. 10 2022 128 781.5, dated Mar. 10, 2023, 8 pages (not prior art).

* cited by examiner

MATERIAL PROCESSING DEVICE AND METHOD FOR ADJUSTING A CONVEYOR DEVICE OF A MATERIAL PROCESSING DEVICE

RELATED APPLICATION

The present application claims priority to German Patent Application Ser. No. DE 10 2022 128 781.5, filed on Oct. 28, 2022, which is incorporated herein by reference.

BACKGROUND OF THE DISCLOSURE

The invention relates to a material processing device, in particular a mobile material processing device, having a conveyor device, in particular a conveyor belt, for conveying processed material and/or material to be processed in a direction of conveyance between a pick-up area and a discharge area of the conveyor device, wherein the conveyor device has a first and a second conveying area.

The invention further relates to a process for adjusting a conveyor device of such a material processing device.

DESCRIPTION OF THE PRIOR ART

Such a lateral discharge conveyor for a rock processing plant is known from US 2006/0180436. The lateral discharge conveyor has a first conveyor section that is firmly connected to a frame of the rock processing plant by means of a first frame section. A second frame section is provided connected to the first frame section swiveling about a vertical first axis. An intermediate section of the lateral discharge conveyor is connected to the second frame section. An outer section of the lateral discharge conveyor is swivel connected about a second axis to the intermediate section. Furthermore, support elements in the form of ropes are stretched between an outer end of the lateral discharge conveyor and an attachment point on the frame of the rock processing plant. In an operating state, the lateral discharge conveyor protrudes vertically and laterally from the rock processing plant. To achieve a transport state, the lateral discharge conveyor is swiveled about the first axis to the rock processing plant. Because the attachment point of the support elements to the frame of the rock processing plant is spaced apart from the first axis, the outer end of the lateral discharge conveyor can lower itself in the process.

SUMMARY OF THE DISCLOSURE

The invention addresses the problem of providing a material processing device whose conveyor device can be quickly, easily and safely moved between a space-saving transport configuration and an operating configuration.

The invention also addresses the problem of providing a simple, fast and safe method for adjusting a conveyor device of a material processing device.

Accordingly, the conveyor device has a first and a second conveying area. In that a second joint having a second swivel axis is used to connect the second conveying area to the first conveying area, the second conveying area can be adjusted relative to the first conveying area between a folded-down folded position and an unfolded conveying position. Thus, a space-saving transport configuration suitable for transporting the conveyor device and/or the material processing device can be achieved. Thus, in the folded-down folding position, the overall length of the conveyor device can be reduced, in particular in the direction of conveyance. For instance, a total length can be a distance between the pick-up area and the discharge area measured in the direction of conveyance or in the direction of a longitudinal extension of the material processing device.

In particular, the second conveying area in the conveying position may have substantially the same orientation as the first conveying area, preferably an orientation in the direction of conveyance. In the folded position, the second conveying area may be swiveled toward the first conveying area. Preferably, the discharge area can be provided at the second conveying area and be located above the first conveying area in the folded position.

Further, it is particularly advantageous for transport if a desired and/or permissible total height for transport of the material processing device is not exceeded. For instance, it is conceivable that in an operating configuration suitable for operation of the material processing device, the conveyor device is disposed inclined relative to the horizontal by an angle of inclination. Thus, a height difference can be established between the pick-up area and the discharge area of the conveyor device. In this way, for instance, material that has been processed and/or is to be processed can be fed from one unit, in particular a screening unit, to a further unit of the material processing device or a further material processing device, for instance a crusher. It is also conceivable that processed material is to be fed to a stockpile, for instance.

With a correspondingly inclined conveyor device, the overall height of the conveyor device and/or the overall height of the material processing device can thus also depend on the overall length of the conveyor device, in particular in the direction of conveyance. Consequently, if the overall length of the conveyor device is reduced in the folded position of the second conveying area compared to the operating position, a reduced overall height in the transport configuration can also be achieved.

The first conveying area is swivel coupled about a first joint with a first swivel axis to the material processing device in the area of the first connection. In the area of the first connection, the first conveying area can be coupled directly or indirectly to the material processing device. The first connection can form the first joint. For instance, it is conceivable that the first conveying area is connected to a chassis of the material processing device in the area of the first connection. Furthermore, it is conceivable that the first conveying area is connected to a machine part of the material processing device, for instance to a housing of a unit of the material processing device, such as to a housing of a screening unit. Provision may also be made for the first conveying area in the area of the first connection to be connected to a swivel device, which, in addition to swiveling about the first swivel axis, enables further swiveling about a further swivel axis. The swivel device can be connected directly or indirectly to the material processing device, for instance to a chassis or a machine part.

A second connection is provided to prevent any undesirable swiveling of the conveyor device about the first swivel axis, for instance from its desired angle of inclination in the transport configuration or operating configuration. In the area of the second connection, the second conveying area is connected to a tension means by means of a third joint, which may be formed, for instance, as one or more guy ropes, chain(s) or rod(s). The second connection can form the third joint. A fixed coupling of a flexible tension means can also be regarded as a joint.

To be able to exert a matching holding force between the conveyor device and the material processing device, the tension means can furthermore be coupled to the material processing device in the area of a coupling point. It is conceivable that the coupling point is provided on a machine part of the material processing device, for instance on a housing of a unit of the material processing device. It is also conceivable that the coupling point is provided on the swivel device.

Because provision is made for the first conveying area to be coupled to the material processing device so as to swivel about a first swivel axis, in particular if the second connection to the second conveying area is further provided spaced apart from the second swivel axis, an adjustment of the second conveying area into the folded position can advantageously also achieve a reduction of the angle of inclination, which the conveyor device assumes with respect to the horizontal. By swiveling-in the second conveying area, a distance between the second connection and the coupling point can be reduced while the angle of inclination is kept constant. A tension means of a certain length would now be loosened or relieved in this imaginary situation. Accordingly, the conveyor device can now lower itself, for instance following the force of gravity. When, at a correspondingly reduced angle of inclination, the distance between the second connection and the coupling point essentially corresponds again to the length of the tension means, the lowering can be terminated. In this position, the tension means can again transfer a load exerted by the tethered conveyor device to the material processing device. In other words, when the second conveying area is folded down, the position of the second connection on the second conveying area can simultaneously lower the conveyor device at least in some areas.

Thus, the overall height can be further reduced in the folded-down folded position of the second conveying area. Consequently, both overall length and overall height of the conveyor device or material processing device can be reduced in one operation.

According to an advantageous embodiment of the invention, proposition is made for the pick-up area to be provided in the area of a pick-up end of the first conveying area, for the discharge area to be provided in the area of a discharge end of the second conveying area, and preferably for the second swivel axis to be provided in the area of a transfer end of the first conveying area opposite from the pick-up end and of a pick-up end of the second conveying area opposite from the discharge end.

In this way, the swivelability of the second conveying area relative to the first conveying area can be easily achieved by design. For instance, it is conceivable that at least one swivel bearing is formed in the area of the transfer end of the first conveying area, to which the pick-up end of the second conveying area is connected. For instance, the first conveying area and second conveying area may have one or more bearing bores that may be interaligned and hold bearing bolts to form the swivel bearing.

A particularly compact transport configuration, in particular in the folded position, can be achieved by the second swivel axis forming an angle of at most ±5° with the first swivel axis, and in particular being aligned in parallel to the first swivel axis. Thus, the second conveying area can be at least partially folded down about the second swivel axis in the direction of the first conveying area.

If further provision is made for the first swivel axis to form an angle of at most ±5° with the horizontal, to be in particular aligned horizontally, a reduction in the overall height of the conveyor device and/or the material processing device can be effectively achieved by swiveling the second conveying area into the folded position.

Particularly preferably, the first swivel axis can form an angle of 85° to 95° with the direction of conveyance, and in particular be aligned perpendicular to the direction of conveyance.

According to the invention, provision may also be made for a distance between the second connection and the first connection in the folded position to be smaller than in the conveying position of the second conveying area. In a geometric view, the coupling point, the second connection and the first connection can be considered as a triangle, wherein the tension means and the area of the conveyor device between the first connection and the second connection form two opposite legs. If the latter leg is now shortened by reducing the distance, wherein the length of the former leg is maintained, this can be compensated for by a changed angle, in particular a changed angle of inclination. Preferably, therefore, provision may be made for, at least partly due to the smaller distance, the angle of inclination between the first conveying area and the horizontal to be smaller in the folded position than in the conveying position of the second conveying area.

It may be desirable to observe in the transport configuration not only a permissible overall height but furthermore to consider a desired ground clearance, for instance to be able to load the conveyor device and/or the material processing device or parts of the material processing device via a ramp. For instance, it may be desirable for the conveyor device to be raised for transport, particularly in the area of its pick-up area, compared to the operating configuration.

Thus, according to a preferred embodiment, proposition is made for the first connection is provided spaced apart from the pick-up end of the first conveying area in the direction of conveyance. Thus, when the angle of inclination is reduced, the pick-up end of the first conveying area can also be swiveled about the first swivel axis, wherein the pick-up end is located on an end opposite from the first swivel axis with respect to the transfer end and/or the discharge section, and thus undergoes a lifting instead of a lowering.

A material processing device according to the invention can be such that the first conveying area and the second conveying area each have a top face and an underside and a center plane, wherein the center planes each extend centrally between the top face and the underside and in parallel thereto, and that the second swivel axis and/or the second connection is/are provided above the center planes, preferably above the top faces, at least in the conveying position. In this way, favorable leverage ratios of the forces acting on the conveyor device, in particular a tension force transmitted by the tension means, can be achieved with respect to the second swivel axis. Furthermore, with such an arrangement, the top face of the second conveying area can be positioned opposite from the top face of the first conveying area in the transport position to save space.

According to an advantageous further development of the invention, proposition is made for the second conveying area to be articulated in a self-locking manner to the first conveying area in the conveying position in such a way that a self-acting displacement of the second conveying area relative to the first conveying area in the direction towards the folded position is prevented. Accordingly, any unintentional, in particular only partial, swiveling-in of the second conveying area can be prevented. For instance, it is conceivable that a device is provided that offers protection against folding down in a normal operating state, for instance, that at least one folding drive is provided on the conveyor device that has a holding function.

However, it may be desirable to avoid unintentional folding down even when the folding drive is powerless, for instance in the event of failure. Unwanted and/or uncontrolled folding down could otherwise result in a risk of damage to the conveyor device and/or a risk of injury to persons.

Furthermore, energy savings can be achieved by means of self-locking. Thus, if there were no self-locking mechanism, the unfolded conveying position would have to be held in place by a folding drive, if necessary, with an energy input.

Self-locking can in particular be achieved or at least supported by the first conveying area having a first center of mass, in which a first weight force acts, by the second conveying area having a second center of mass, in which a second weight force acts, by the tension means exerting a tension force on the second connection, the moment of which with respect to the first swivel axis is in equilibrium with the sum of the moments of the first and second weight forces, by, at least when the second conveying area is in the folded-up state, the sum of the moments of the second weight force and of the tension force with respect to the second swivel axis being equal to zero or having a positive magnitude and being directed in the direction of swiveling of the second conveying area into the conveying position.

In addition or alternatively, self-locking can of course also be achieved and/or supported by other means. For instance, it is conceivable that frictional forces and/or moments in bearing points, for instance in a folding mechanism that enables swiveling about the second swivel axis, in particular in a swivel bearing, cause or support self-locking. It is also conceivable that the second conveying area can be provided overextended in the conveying position relative to the first conveying area. In such an overextended position, the second connection relative to the second swivel axis and/or the orientation of the tension means may be such that the moment exerted by the tension force relative to the second swivel axis acts in the direction of the conveying position.

It may be further desirable for self-locking to occur at least when the conveyor device is unloaded. Preferably, however, provision may be made for the self-locking to also occur in the case where the conveyor device is loaded, for instance with material that has been processed or is to be processed, in which case the first weight force results from the mass of the first conveying area and preferably the mass of material located thereon, the position of the first center of mass results from the spatial distribution of the mass of the first conveying area and preferably the mass of the material located thereon, and/or the second weight force results from the mass of the second conveying area and preferably the mass of the material located thereon, and the position of the second center of mass results from the spatial distribution of the mass of the second conveying area and preferably the mass of the material located thereon.

Self-locking can be achieved or supported in particular by selecting the position of the first swivel axis and/or the second swivel axis and/or the first center of mass and/or the second center of mass and/or the second connection and/or the coupling point and/or the amount of the first weight force and/or the second weight force accordingly.

Preferably, in this case, the position of the second connection in the transport direction of the second conveying area can be disposed in an area which faces the second swivel axis and is spaced no further than 30%, further preferably no further than 15%, particularly preferably no further than 10%, in particular no further than 5% of the length of the second conveying area in its transport direction from the second swivel axis. Thus, a lever arm of the traction force with respect to the second swivel axis can be adjusted to a dimension that at least does not prevent self-locking.

In addition, owing to the small distance from the second connection to the second swivel axis, an angle of inclination that is not reduced beyond a desired level when the second conveying area is folded down into the folded position can be achieved.

According to an advantageous further development of the invention, proposition is made for the conveyor device to have a folding mechanism having at least one folding drive, for the folding drive effects or at least supports an adjustment of the second conveying area between the folded position and the conveying position, wherein the folding drive has an actuating element, in particular a hydraulic cylinder, particularly preferably a double-acting hydraulic cylinder, and a transmission element, preferably a piston rod, which is adjustable relative to the actuating element.

The folding drive can, for instance, be connected to a control device and controlled by it. The folding drive can provide convenient and safe adjustment of the second conveying area between the folded-down folded position and the unfolded conveying position. In particular, if provision is made for the second conveying area to be held in a self-locking manner in the conveying position, the folding drive can apply a required force or moment to transfer the second conveying area into the folded position.

A structurally simple and reliable power transmission between the first conveying area, the folding drive and the second conveying area can be achieved in particular if provision is made for the actuating element to be coupled to the first conveying area, and for a lever element to be provided, which, on the one hand, is swivel coupled to the transmission element by means of a first swivel bearing and, on the other hand, is swivel coupled to the second conveying area by means of a second swivel bearing spaced apart from the second swivel axis.

If a guide element is provided, which on the one hand is swivel coupled to the first conveying area by means of a third swivel bearing, and which on the other hand is swivel coupled to the transmission element, preferably to the lever element, by means of a fourth swivel bearing, and that during a swiveling of the second conveying area about the second swivel axis the lever element is guided on the first conveying area by means of the guide element, the motion sequence of the folding mechanism can be guided safely during the adjustment of the second conveying area. In particular, forces acting transversely to an adjustment direction of the transmission element with respect to the actuator can be at least partially absorbed by the guide element. This can prevent damage and/or excessive wear of the folding drive, in particular if the actuator is designed as a hydraulic cylinder and the transmission element as a piston rod.

Preferably, the lever element can be guided on a circular path in the area of the fourth swivel bearing.

According to an advantageous further development of the invention, proposition is made for the/a folding drive to be provided below center plane(s) of the conveying areas, preferably below underside(s) of the conveying areas, at least in the conveying position. In this way, favorable leverage ratios of the forces applied by the folding drive to adjust the second conveying area can result with respect to the second swivel axis.

As this has been pointed out, it may be desirable to be able to reduce the overall length and/or overall height of the conveyor device for transport and/or to maintain a desired ground clearance for transport.

In addition, however, it may also be desired to change the positioning of the conveyor device, for instance the orientation of its longitudinal extension with respect to the material processing device, to achieve a compact configuration for transport. This can be achieved in a simple manner if the conveyor device is mounted on the material processing device so as to be swivelable about a third swivel axis between an operating position and a transport position, wherein the third swivel axis extends transversely to the first swivel axis, preferably forming an angle of 85° to 95° with the first swivel axis, in particular being aligned perpendicular to the first swivel axis, wherein in particular the third swivel axis forms an angle of at most ±5° with the vertical, and in particular preferably being aligned vertically. Preferably, in the transport position, the conveyor device can be swiveled about the third swivel axis by at least 170°, and more preferably by 180°, relative to the operating position.

In this way, a particularly compact transport configuration of the conveyor device and/or the material processing device can be achieved.

Swiveling of the conveyor device about the third swivel axis can preferably be effected and/or supported by a swivel drive. The swivel drive can, for instance, be connected to a control device and be controlled thereby.

According to a preferred embodiment of the invention, it is proposed to dispose the pick-up area in the operating position in the area of a transfer unit of a first unit of the material processing device, in particular in the area of a branch belt of a screening unit, for picking up material to be conveyed from the first unit, and to dispose the discharge area in the operating position in the area of a feed unit of a further unit of the material-processing device or of a unit of a further material-processing device, in particular in the area of a feed hopper of a crusher unit, for transferring the received material to the further unit, wherein the conveyor device in the transport position is swiveled about the third swivel axis preferably by at least 170°, particularly preferably by 180°, with respect to the operating position.

The problem relating to the material processing device is also solved by a material processing device, in particular a mobile material processing device, having a conveyor device, in particular a conveyor belt, for conveying processed material and/or material to be processed in a direction of conveyance between a pick-up area and a discharge area of the conveyor device, wherein the conveyor device has a first and a second conveying area, wherein the first conveying area is coupled to the material processing device in the area of a first connection such that it can swivel about a first swivel axis, wherein a tension means is provided, which is coupled to the material processing device on the one hand in the area of a coupling point and on the other hand in the area of a second connection spaced apart from the first connection, wherein the second conveying area is swivel mounted about a second swivel axis relative to the first conveying area between a folded-down folded position and an unfolded conveying position, wherein the first connection is provided on the first conveying area, and wherein the second connection is provided on the second conveying area spaced apart from the second swivel axis. In particular, such a material processing device may have features of one, more or all of the dependent claims.

BRIEF DESCRIPTION OF THE DRAWINGS

The invention is explained in greater detail below based on an exemplary embodiment shown in the drawings. In the figures.

DETAILED DESCRIPTION

Figure 1:
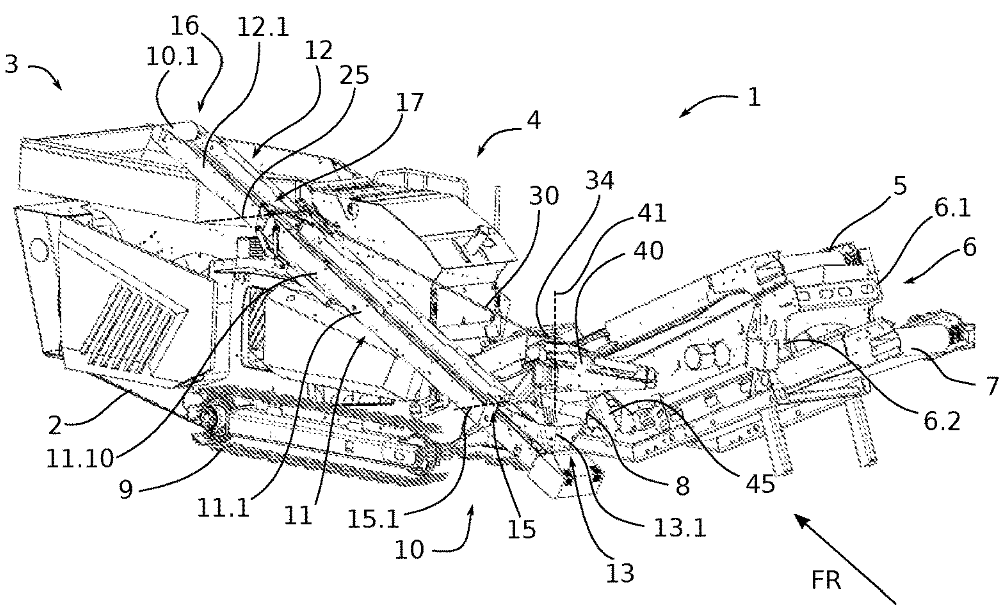
FIG. 1 shows a perspective view of a schematic representation of a material processing device 1 having a conveyor device 10 in an operating configuration.

FIG. 1 shows a material processing device 1 in the form of a crusher having a material processing unit in the form of a crusher unit 4. The material processing device is designed as a mobile material processing device and therefore has undercarriages 9. However, it is also conceivable that the material processing device 1 is a stationary material processing device 1.

The material processing device 1 has a chassis 2 that bears the machine components or at least a part of the machine components. Chassis 2 may also be referred to as a machine frame 2. A feed unit 3 is formed at a rear end of the material processing device 1. The feed unit 3 may comprise a feed hopper.

The feed hopper may be formed at least in part by hopper walls extending in the longitudinal direction of the material processing device 1 and a rear wall extending transverse to the longitudinal direction.

The feed unit 3 can be used to feed material to be broken into the material processing device 1, for instance using a wheel loader, and to feed it the crusher unit 4 via a conveyor chute.

The crusher unit 4 may, for instance, be in the form of a rotary impact crusher unit, a jaw crusher or a gyratory crusher.

The crushed material can leave the crusher unit 4 through a crusher outlet and be routed out of the working area of the crusher unit 4, for instance, by means of a crusher discharge belt 5.

As can be further seen in FIG. 1, the crusher discharge belt 5 can be designed as an endless circulating conveyor belt. At the belt ends, the crusher discharge belt 5 can be deflected, for instance, by means of deflection rollers. Guides, in particular support rollers, can be provided in the area between the deflection rollers to change the direction of conveyance of the conveyor belt, to shape the conveyor belt in a certain way and/or to support the conveyor belt.

A screening unit 6 can be disposed downstream of the crusher discharge belt 5. The screening unit 6 can have a screen housing 6.1, in which at least one screen deck is mounted. Below the screen deck, a lower housing part 6.2 can be formed, which is used as a collection space for the material screened out at the screen deck 6.1.

An opening in the lower housing part 6.1 creates a spatial connection to the further fine-grain belt 7. The fine-grain belt 7 conveys the screened-out material towards its discharge end. From there, the screened material is transferred to a rock pile, for instance.

The material not screened out on the screen deck of screen unit 6 is conveyed from the screen deck to a transfer unit 8, in this case to a branch belt. In FIG. 1, the transport direction of the transfer unit 8 extends out of the image plane.

At its discharge end, the branch belt 8 can transfer the un-screened material, also referred to as oversize material, to a pick-up area 13 of a conveyor device 10.

Figure 2:
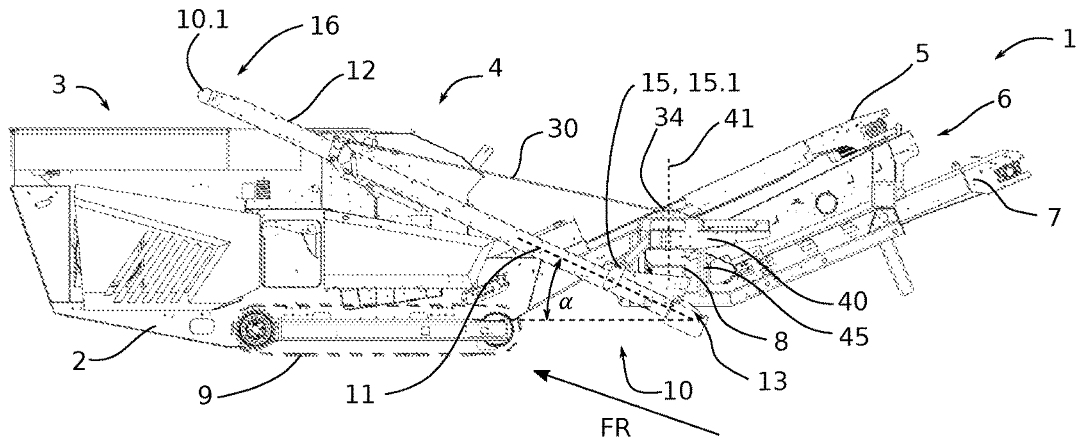
FIG. 2 shows a side view of a schematic representation of the material processing device 1 having the conveyor device 10 in an operating position.

FIG. 2 shows a schematic side view of the material processing device 1.

A position of the conveyor device 10, as shown in FIGS. 1 and 2, may correspond to an operating position of the conveyor device 10. The conveyor device 10 may also be referred to as a conveyor 10. The operating position can be such that the pick-up area 13 of the conveyor device 10 is disposed in the area of the transfer unit 8 of the screening unit 6, in this case the branch belt of the screening unit 6. The conveyor device 10 can have a receiving hopper 13.1 in the pick-up area 13, into which the material transferred from the transfer unit 8 can be filled.

The conveyor device 10 can be designed as a belt conveyor and can have an endless circulating conveyor belt, which has a slack side on its top face and a tight side (not shown) on its underside. The slack side can be used to collect the fed material, which is fed in the pick-up area 13 of the conveyor device 10, and to transport it away to a discharge area 16 in a direction of conveyance FR.

At the belt ends, deflection rollers 10.1 can be used to deflect the conveyor belt from the slack side to the tight side and vice versa. Guides, in particular support rollers, can be provided in the area between the deflection rollers to change the direction of conveyance of the conveyor belt, to shape the conveyor belt in a certain way and/or to support the conveyor belt (not shown).

The conveyor device 10 may further comprise a drive 14, which can be used to drive the conveyor device 10. The drive 14 can preferably be provided adjacent to the pick-up area 13 of the conveyor device 10. The conveyor device 10 can be connected to a control device by means of a control line, for instance by means of the drive 14.

As can be further seen from FIGS. 1 and 2, in the operating position, the discharge area 16 of the conveyor device 10 can be disposed in an area of the feed unit 3 of a unit of the material processing device 1, in this case in the area of the feed hopper of the crusher unit 4. Accordingly, material that has been loaded onto the conveyor device 10 in the pick-up area 13 can be supplied to the feed unit 3.

For instance, in order to compensate for differences in height between the transfer unit 8 and the feed unit 3, the conveyor device 10 can be inclined by an angle of inclination α with respect to the horizontal. To enable the angle of inclination α to be adjusted, the conveyor device 10 can be mounted on the material processing device 1 in the area of a first connection 15 so as to be swivelable about a first swivel axis 15.1.

As can be further seen in FIG. 1, the conveyor device 10 may comprise a first conveyor area 11 and a second conveyor area 12. The first conveyor area 11 may also be referred to as the first conveyor portion 11. The second conveyor area 12 may also be referred to as the second conveyor portion 12. The second conveying area 12 may be mounted to swivel about a second swivel axis 25 relative to the first conveying area 11. The design and function of this swivel connection will be discussed in more detail below.

Furthermore, a tension means 30, in particular one or more guy ropes, may be provided. A first end area 31 of the tension means 30 may be coupled to the material processing device 1 in the area of a coupling point 34. An opposite second end area 32 may be used to couple the tension means 30 to a second connection 17 on the conveyor device 10. The second connection 17 may also be referred to as a tension connection 17. The tension means 30 can thus exert a tension force between the conveyor device 10 and the material processing device 1, which can keep the conveyor device 10 at a desired angle of inclination α.

The angle of inclination α can be adjusted, for instance, by selecting a length of the tension means 30. Alternatively or additionally, as shown here, a setting means 33 can be provided on the tension means 30, which can be used to adjust the length of the tension means 30. A spanner may for instance be provided to that end. As in this case, the tension means 30 may have a guy rope, to which two spanners are connected in a Y-shaped branching manner in the second end area 32. The spanners may be coupled to the conveyor device 10 in the area of the second connection 17. As can be seen in FIG. 1, the second connection 17 may have two connection points, which may be provided on the conveyor device 10 opposite each other transversely to the direction of conveyance FR.

Figure 3:
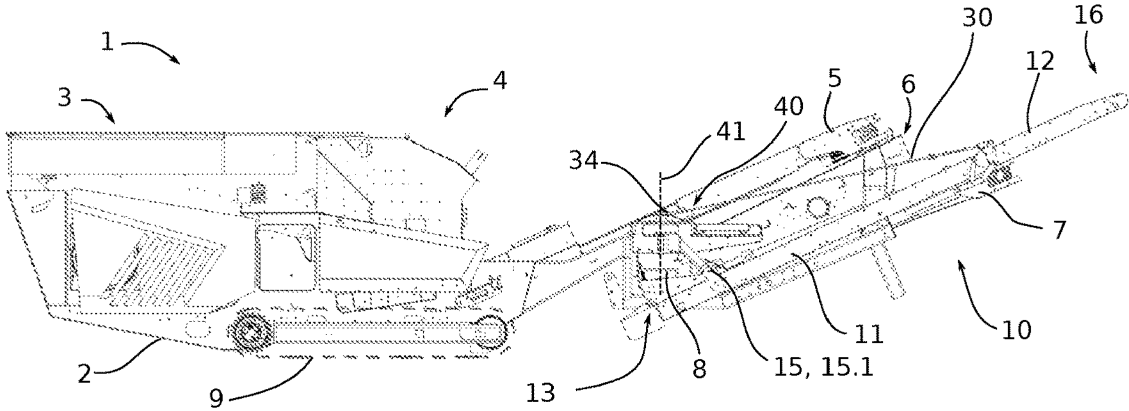
FIG. 3 shows a side view of a schematic representation of the material processing device 1 having the conveyor device 10 in a transport position.

FIG. 3 shows a transport position of the conveyor device 10. Compared to the operating position, in the transport position the conveyor device 10 can accordingly be swiveled about a third swivel axis 41. The third swivel axis 41 can preferably be provided in the area of the pick-up area 13 of the conveyor device 10. A swivel device 40 may be provided for moving the conveyor device 10 between the operating position and the transport position. A possible embodiment of the swivel device 40 will be discussed in more detail later.

The third swivel axis 41 can preferably be a vertical axis. Preferably, the conveyor device 10 can be swiveled by 180° about the third swivel axis 41 between the operating position and the transport position, as is evident from the exemplary embodiment shown in the figures. In the exemplary embodiment shown, in the transport position, in contrast to the operating position, the discharge area 16 is now no longer located in the area of the feed unit 3. Accordingly, in the transport position, the conveyor device 10 is no longer aligned towards the crusher unit 4, but for transport advantageously along the screening unit 6.

Figure 4:
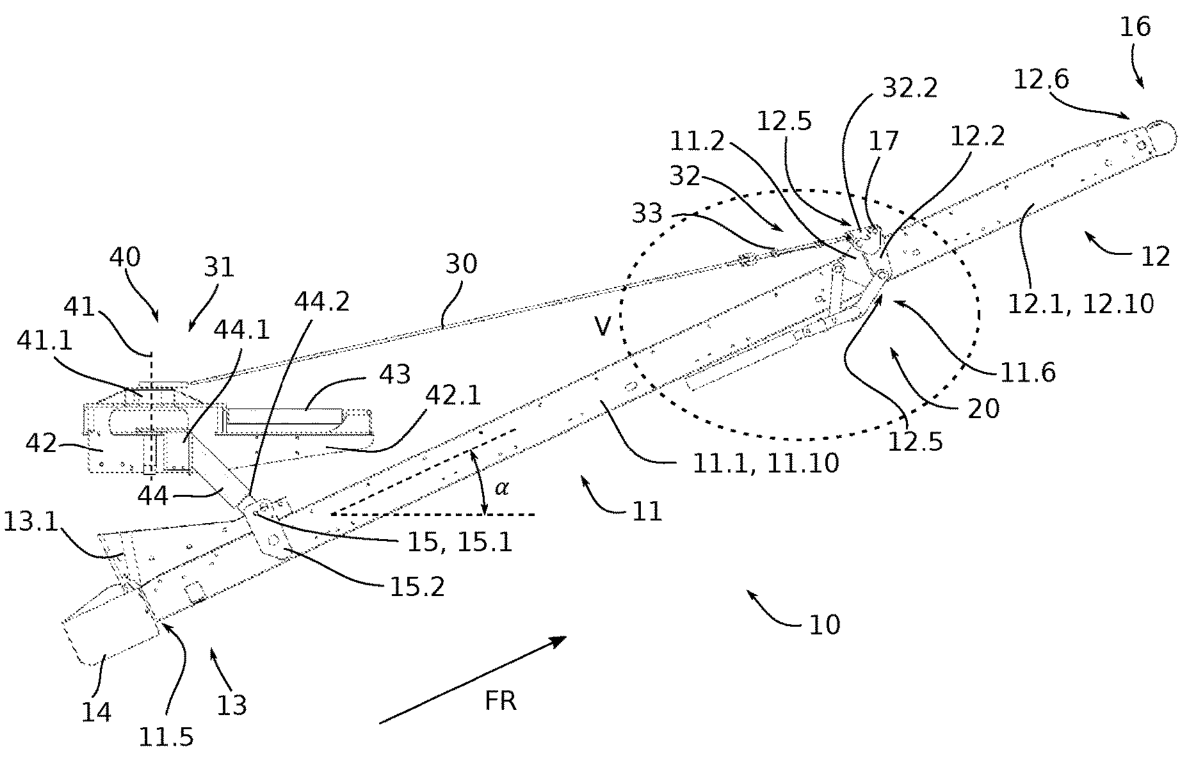
FIG. 4 shows a side view of a schematic representation of a conveyor device 10 in an unfolded conveying position.

FIG. 4 shows a schematic side view of the conveyor device 10, the swivel device 40 and the tension means 30. The swivel device 40 may comprise a base part 42, which an arm section 42.1 may adjoin. A beam 45 can be used to attach the swivel device 40 to the material processing device 1, for instance to the chassis 2 in the area of the screening unit 6 (see FIG. 1). The swivel device 40 may further comprise a swivel bearing 41.1 that permits rotation about the third swivel axis 41.

The swivel bearing 41.1 may be used to support a boom 44 by a first end area 44.1 on the swivel device 40. At an opposite second end area 44.2 of the boom 44, the first connection 15 may be provided for coupling the conveyor device 10. As can be seen in FIG. 1, the second end area 44.2 may be configured as a beam oriented transversely to the direction of conveyance FR of the conveyor device 10. In so doing, the second end area 44.2 may extend between two side walls 11.10 of a first belt frame 11.1 of the first conveyor area 11.

Fastening elements 15.2 can be provided on the side walls 11.10 of the first belt frame 11.1, in particular transverse to the direction of conveyance FR on both sides of the first belt frame 11.1, which can be plate-shaped, for instance. The fasteners 15.2 may form a swivel bearing with the second end area 44.2 of the boom 44, permitting rotation about the first swivel axis 15.1. For instance, the second end area 44.2 and/or fastening elements 15.2 may have mounts through which a bearing bolt can be guided.

The boom 44 can thus be used to mount the conveyor device 10 to the swivel bearing 41.1 of the swivel device 40 such that it can swivel about the third swivel axis 41.

The swivel device 40 may further have a swivel drive 43. It can be provided on an arm section 42.1, as shown here. For instance, the swivel drive 43 may be a hydraulic swivel drive 43 having a, preferably double-acting, hydraulic cylinder and a piston rod adjustable relative thereto. An adjustment of the swivel drive 43 can be converted into a swiveling of the boom 44 about the third swivel axis 41 in a suitable manner, for instance via a gearing or an articulated lever.

The coupling point 34 for coupling the tension means 30 to the material processing device 1 may also be provided at the swivel device 40. Preferably, the first end area 31 of the tension means 30 can be rotatably coupled to the material processing device 1, in particular, as in this case, mounted on the swivel device 40. The coupling point 34 may be provided in the area of the third swivel axis 41, and particularly preferably cause the tension means 30 to swivel about the third swivel axis 41, which is preferably vertical, as shown in FIG. 4.

As can be further seen in FIG. 4, the first connection 15 may be provided in the area of the pick-up area 13 of the conveyor device 10. In particular, the first connection 15 may be provided closer to a pick-up end 11.5 of the first conveying area 11 than to a transfer end 11.6.

Figure 5:
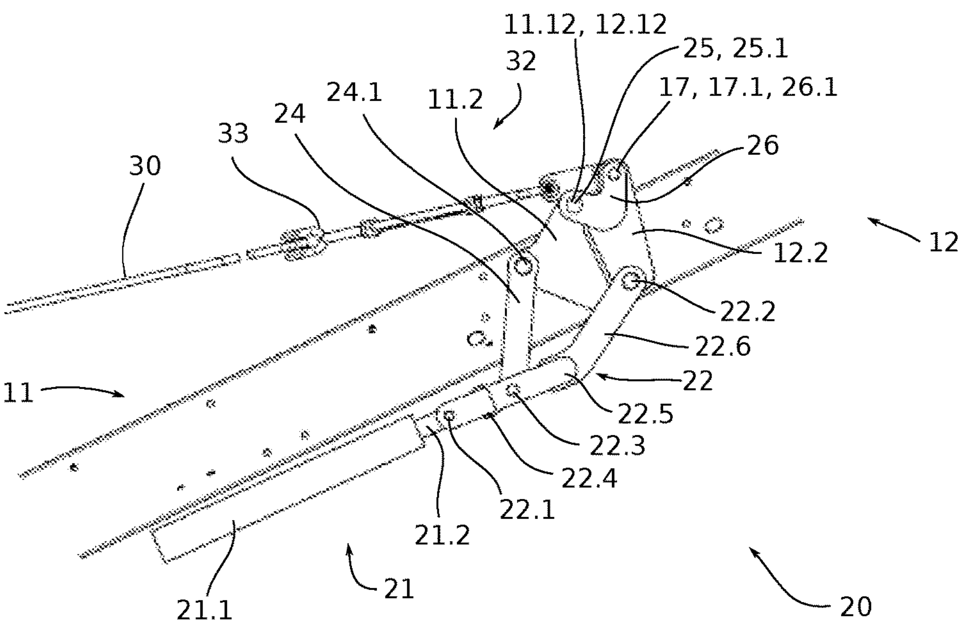
FIG. 5 shows a detailed view of an area marked in FIG. 4.
Figure 6:
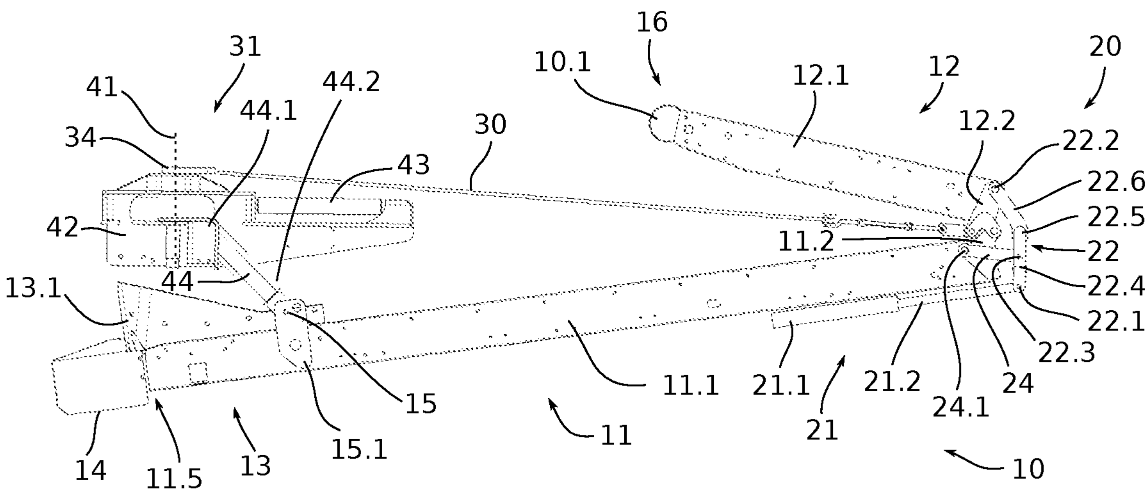
FIG. 6 shows a side view of a schematic representation of a conveyor device 10 in a folded-down folded position.
Figure 8:
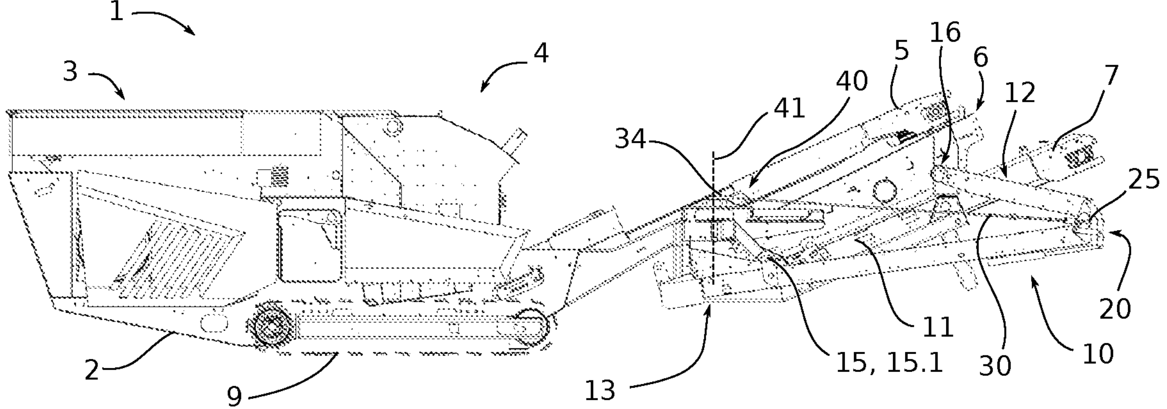
FIG. 8 shows a schematic side view of a material processing device 1 having a conveyor device 10 in a transport configuration.

The second swivel axis 25 can be provided in the area of the transfer end 11.6 of the first conveying area 11 and of a pick-up end 12.5 of the second conveying area 12. The second conveying area 12 may be swivel mounted about the second swivel axis 25 relative to the first conveying area 11 between an unfolded conveying position, as shown in FIGS. 1 through 5, and a folded-down folded position, as shown in FIGS. 6 and 8. In other words, a swivel bearing may be formed between the first conveying area 11 and the second conveying area 12 in the area of the transfer end 11.6 of the first conveying area 11 and the pick-up end 12.5 of the second conveying area 12.

For this purpose, reinforcement elements 11.2, 12.2 can be provided on side walls 11.10, 12.10 of the belt frames 11.1, 12.1 of the first and second conveying areas 11, 12, respectively. Preferably, the reinforcement elements 11.2, 12.2 can be provided transverse to the direction of conveyance FR on both sides of the belt frames 11.1, 12.1. The reinforcement elements 11.2, 12.2 may each have bearing mounts 11.12, 12.12 that are interaligned. Bearing bolts 25.1, for instance, can be guided through the bearing mounts 11.12, 12.12 to form the swivel bearing.

As can be further seen in FIG. 4, the second connection 17 may be provided spaced apart from the second swivel axis 25 on the second conveying area 12. Preferably, the second connection 17 may be spaced apart from the second swivel axis 25 along the direction of conveyance FR.

The second conveying area 12 may, for instance, have a bearing mount 26.1, for instance in the form of a bore, on at least one second reinforcement element 12.2. The tension means 30 can have at least one retaining section 32.2 in its second end area 32, which has, for instance, a correspondingly formed bearing mount. A bearing bolt 17.1 can be guided through the bearing mounts to couple the second end area 32 to the second connection 17, preferably in a swiveling manner. Preferably, a connecting element 26 can be provided as reinforcement of the second reinforcement element 12.2 in the area of the bearing mount 12.12 assigned to the second swivel axis 25 and the bearing mount 26.1 assigned to the second connection 17. This may be a plate-shaped element that is attached to the second reinforcement element 12.2 by means of a weld, for instance.

FIG. 4 further shows that a folding mechanism 20 can be provided in the area of the second swivel axis 25. In FIG. 5, a possible design of the folding mechanism 20 can be seen in more detail based on the detail marked in FIG. 4. Accordingly, the folding mechanism 20 may have at least one folding drive 21. The folding drive 21 may also be referred to as a folding actuator 21. The folding drive 21 may have a control element 21.1 and a transmission element 21.2, which can be adjusted relative to the latter. Preferably, the actuator 21.1 is designed as a hydraulic cylinder, in particular as a double-acting hydraulic cylinder. In that case, the transmission element 21.2 can be a piston rod coupled to a piston of the hydraulic cylinder.

The folding drive 21 may be attached to the first conveying area 11, in particular to the first belt frame 11.1. Preferably, the folding drive 21, for instance its actuating element 21.1, is essentially rigidly connected to the first conveying area 11. However, it is also conceivable to provide a swivel connection, for instance of an end area of the actuator 21.1 facing away from the transmission element 21.2, to the first conveying area 11.

A lever element 22 can be swivel coupled to the transmission element 21.2 by means of a first swivel bearing 22.1. The lever element 22 may also be simply referred to as lever 22. In an end area opposite from the first swivel bearing 22.1, the lever element 22 may be swivel coupled to the second conveying area 12 by means of a second swivel bearing 22.2. The second swivel bearing 22.2 can be provided on the end of the conveying area of the second reinforcement element 12.2. Preferably, the second swivel bearing 22.2 is spaced apart from the second swivel axis 25 to provide a lever arm to convert a force of the folding drive 21 into a swivel motion of the second conveying area 12 about the second swivel axis 25.

The lever element 22 may comprise a first segment 22.4 and a second segment 22.6, which are interconnected by means of a connection 22.5. It is conceivable that the segments 22.4, 22.6 are swivel connected to each other. Preferably, however, the segments 22.4, 22.6 are substantially rigidly connected to each other, as shown in the exemplary embodiment.

The folding mechanism 20 can thus effect an adjustment of the actuating element 21.1 relative to the actuating element 21.1 of the folding drive 21 by means of the lever element 22 into a swivel motion of the second conveying area 12 relative to the first conveying area 11 about the second swivel axis 25.

As can be further seen in FIG. 5, the folding mechanism 20 may further comprise a guide element 24, for instance in the form of a lever. The guide element 24 may also be referred to as a guide link 24. The guide element 24 may be swivel coupled to the first conveying area 11 by means of a third swivel bearing 24.1. As in this case, provision may be made for the third swivel bearing 24.1 to be provided on the end of the conveying area of the first reinforcement element 11.2. Spaced apart from the third swivel bearing 24.1, the guide element 24 can be swivel coupled to the lever element 22 by means of a fourth swivel bearing 22.3, as in this case.

However, it is also conceivable that the guide element 24 is swivel coupled to the transmission element 21.2 by means of the fourth swivel bearing 22.3, in particular if the actuator 21.1 is provided on the first conveying area 11 in a swiveling manner, as previously described.

The guide element 24 can be used to safely guide the lever element 22 during an adjusting movement of the second conveying area 12 about the second swivel axis 25. The fourth swivel bearing 22.3 can execute a circular path about the third swivel bearing 24.1 (see also FIG. 6). In particular, the guide element 24 can be used to ensure that no or only minor transverse forces act on the transmission element 21.2 when the second conveying area 12 is adjusted.

Because of the side view, only one folding mechanism 20 is visible in the figures. Preferably, a folding mechanism 20 of at least partially similar design can be provided on the opposite end transverse to the direction of conveyance FR. It is also conceivable that at least one or more components of the folding mechanism 20 are provided on opposite ends of the conveyor device 10.

FIG. 6 shows a schematic side view of the conveyor device 10 in the folded-down folded position. In the folded position, the discharge area 16 may be located above the first conveying area 11. It is conceivable that the second conveying area 12 is folded completely onto the first conveying area 11 in the folded state, for instance resting thereon. Preferably, however, as shown here, a distance or a certain opening angle can remain between the conveying areas 11, 12.

As can be seen from a comparison of FIGS. 5 and 6, the overall length of the conveyor device 10 in the direction of conveyance FR can be reduced by swiveling the second conveying area 12 into the folded position. This can in and of itself result in a reduction of the dimensions of the conveyor device 10, which is advantageous for transport.

However, it is also clear from the figures that by swiveling the second conveying area 12 into the folded position, the angle of inclination $\alpha$ of the conveyor device 10 can be reduced. Accordingly, the conveyor device 10 can be folded and lowered simultaneously, saving time and money. Particularly advantageous for a transport, both the length and the height of the conveyor device 10 can be reduced in one operation.

Lowering can result in particular from an imaginary connecting line between the second connection 17 and the coupling point 34 of the tension means 30 in the folded position being shorter at a certain angle of inclination $\alpha$ than in the conveying position. This may be due in particular to the spacing of the second connection 17 from the second swivel axis 25.

Because the coupling point 34 is disposed spaced apart from the first swivel axis 15.1, the imaginary connecting line is shorter at a reduced angle of inclination $\alpha$ than at a larger angle of inclination $\alpha$. Thus, if the tension means 30 is preferably of a fixed length, the conveyor means 10 can lower itself about the first swivel axis 15.1 when the second conveying area 12 is moved to the folded position.

Particularly advantageously, a reduction in the angle of inclination $\alpha$ can also cause the pick-up end 11.5 of the first conveying area 11 to rise. This can be achieved, in particular, by arranging the first connection 15 spaced apart from the pick-up end 11.5. It is therefore also possible to increase the ground clearance, particularly for transport purposes, when the second conveying area 12 is transferred from the conveying position to the folded position.

Figure 7:
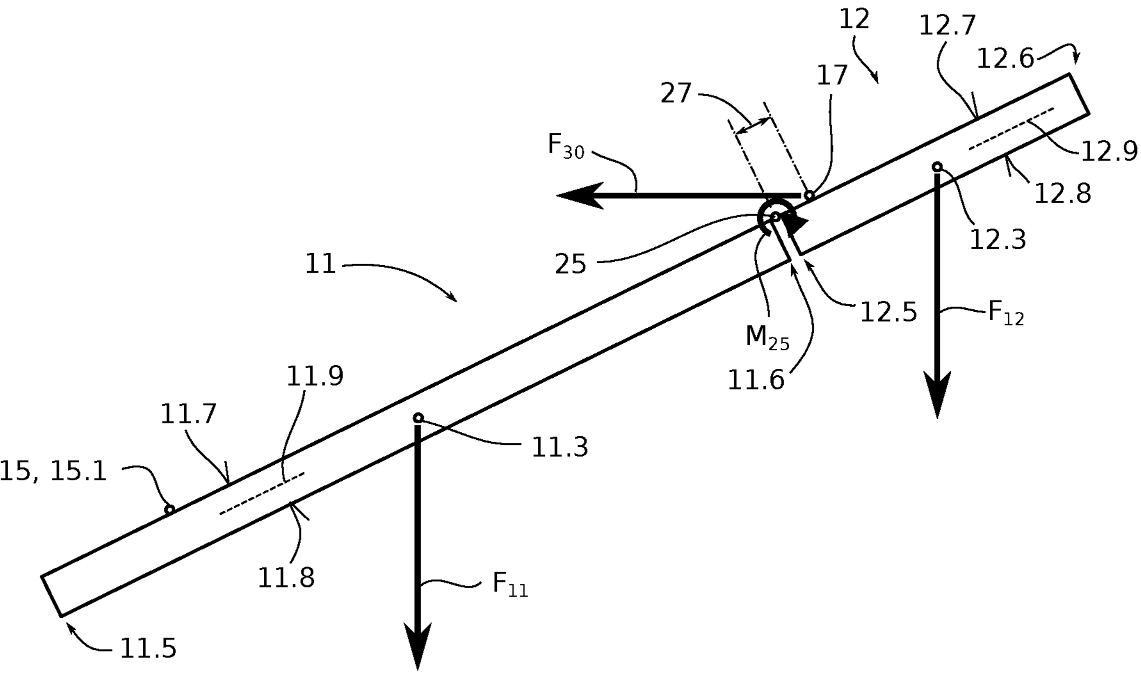
FIG. 7 shows a schematic representation of the force ratios on a conveyor device 10.

FIG. 7 shows a schematic representation of the force and moment ratios on the conveyor device 10.

Preferably, a self-locking mechanism can prevent self-acting movement of the second conveying area 12 from the conveying position to the folded position. As shown in FIG. 7, the first conveying area 11 may have a first center of mass 11.3 where a first weight force $F_{11}$ is applied. Likewise, the second conveying area 12 can have a second center of mass 12.3 in which a second weight force $F_{12}$ is applied.

For an initial consideration of the force and moment ratios at the conveyor device 10, the swivelability about the second swivel axis 25 can initially be disregarded, such that a rigid connection between the conveying areas 11, 12 can initially be assumed.

In order for the conveyor device 10 to be in equilibrium in this view, the tension means 30 exerts a tension force $F_{30}$, whose moment with respect to the first swivel axis 15.1 is in equilibrium with the sum of the moments of the first and second weight forces $F_{11}$, $F_{12}$, on the second connection 17. In other words, the tensile force $F_{30}$ results from the position of the centers of gravity, the weight forces and the position of the linkages. The weight forces and the location of the centers of gravity can, of course, take into account any material on the conveyor device 10 and its mass distribution.

For a more detailed consideration of self-locking, the swivelability about the second swivel axis 25 must now be taken into account, wherein, however, the second swivel axis 25 can be regarded simplistically as a fixed bearing, which only permits rotation of the second conveying area 12. Accordingly, the first conveying area 11 can be disregarded in this consideration.

As indicated in FIG. 7, the acting forces result in a moment $M_{25}$ about the second swivel axis 25 that acts on the second conveying area 12. The moment $M_{25}$ results from the sum of the moments of the tensile force $F_{30}$ and the second weight force $F_{12}$ about the second swivel axis 25.

Self-locking can then be achieved in particular by the sum of the moments of the second weight force $F_{12}$ and the tensile force $F_{30}$ being equal to zero or having a positive magnitude with respect to the second swivel axis 25 and being directed in the direction of swiveling of the second conveying area 12 into the conveying position.

For this purpose, in particular, a distance 27 of the second connection 17 from the second swivel axis 25 can be designed to influence the lever arm of the tractive force $F_{30}$. In particular, the distance 27 can be designed in such a way that a moment of the tensile force $F_{30}$ results, which is preferably lower than that of the second weight force $F_{12}$.

Furthermore, it is conceivable to select the position of the first swivel axis 15.1 and/or the second swivel axis 25 and/or the first center of mass 11.3 and/or the second center of mass 12.3 and/or the second connection 17 and/or the coupling point 34 and/or the amount of the first weight force $F_{11}$ and/or the second weight force $F_{12}$ accordingly.

Self-locking can, of course, also be achieved or supported by friction in the bearing points of the swivel bearing assigned to the second swivel axis 25 or of the folding mechanism 20. It is also conceivable, in addition or alternatively, that the second conveying area 12 can be provided in the conveying position overextended relative to the first conveying area 11, whereby self-locking can also be achieved or supported.

FIG. 8 shows a side view of the material processing device 1 in a preferred transport configuration. In that case, the conveyor device 10 can be in an operating position swiveled about the third swivel axis 41 into the transport position as compared to the operating position shown in FIGS. 1 and 2, as explained above with respect to FIG. 3.

In addition, however, the second conveying area 12 of the conveyor device 10 may also be in the folded-down folded position in the preferred transport configuration shown in FIG. 8. In this way, an overall height and/or an overall length of the material processing device 1 can be optimized for transportation, as illustrated by a comparison with FIG. 3. Furthermore, a ground clearance below the conveyor device 10 may be increased in the manner described above.

The operation of the shown exemplary embodiment is explained below, based on an adjustment from a preferred operating configuration, as shown in FIGS. 1 and 2, to a preferred transport configuration, as shown in FIG. 8.

Initially, the conveyor device 10 may be in the operating configuration. If a transfer to the transport configuration is now to be performed, the conveyor device 10 can be transferred from the operating position to the transport position in a first step by means of the swivel device 40 about the third swivel axis 41. Thus, a state shown in FIG. 3 can be achieved. Now, in a second step, the folding mechanism 20 can be used to cause the second conveying area 12 to fold down into the folded position. Thus, the transport configuration shown in FIG. 8 may be achieved.

Of course, it is also conceivable to perform the steps described above in reverse order. Preferably, however, as previously described, swiveling about the third swivel axis 41 can be performed as the first step. In the conveying position, the end 11.5 of the first conveying area 11 on the pick-up end can be advantageously lowered compared to the folded position. In this lowered position, it can be passed underneath a part of the material processing device 1, preferably underneath the chassis 2 and/or an area of the screening unit 6, when swiveling about the third swivel axis 41.

For a transfer from the transport configuration to the operating configuration, the second conveying area 12 can be transferred to the conveying position in a first step by means of the folding mechanism 20. Thus, the state shown in FIG. 3 can be achieved. Subsequently, in a second step, the swivel device 40 can be used to swivel the conveyor device 10 about the third swivel axis 41 from the transport position to the operating position. In this case, too, it is conceivable to perform the steps in reverse order.

The invention claimed is:

1. A mobile material processing apparatus, comprising:
- a base part;
- a conveyor for conveying material in a direction of conveyance between a pick-up area and a discharge area of the conveyor, the conveyor being connected to the base part such that the conveyor may swivel about a first swivel axis relative to the base part;
- wherein the conveyor includes a first conveyor portion and a second conveyor portion connected together such that the second conveyor portion may swivel about a second swivel axis relative to the first conveyor portion between a folded position and an unfolded conveying position;
- a tension element connected on one end to the base part and on another end to the second conveyor portion at a tension connection spaced apart from the first swivel axis and the second swivel axis;
- wherein a distance between the tension connection and the first swivel axis is smaller in the folded position than in the unfolded conveying position; and
- wherein an angle of inclination between the first conveyor portion and a horizontal plane is smaller in the folded position than in the unfolded conveying position.

2. The mobile material processing apparatus of claim 1, wherein:
- the first conveyor portion includes a first pick-up end and a transfer end;
- the second conveyor portion includes a second pick-up end and a discharge end; and
- the transfer end of the first conveyor portion is connected to the second pick-up end of the second conveyor portion.

3. The mobile material processing apparatus of claim 1, wherein:
- the second swivel axis forms an angle of at most ±5° with the first swivel axis;
- the first swivel axis forms an angle of at most ±5° with a horizontal plane; and
- the first swivel axis forms an angle in a range of from 85° to 95° with the direction of conveyance of the conveyor.

4. The mobile material processing apparatus of claim 1, wherein:
- the first conveyor portion includes a first pick-up end and a transfer end; and
- the first swivel axis is spaced apart from the first pick-up end of the first conveyor portion in the direction of conveyance.

5. The mobile material processing apparatus of claim 1, wherein:
- the first conveyor portion includes a first top face, a first underside and a first central plane extending centrally between the first top face and the first underside;
- the second conveyor portion includes a second top face, a second underside and a second central plane extending centrally between the second top face and the second underside; and
- the second swivel axis and the tension connection are located above the first and second central planes in the unfolded conveying position of the second conveyor portion.

6. The mobile material processing apparatus of claim 1, wherein:
- the second conveyor portion in the unfolded conveying position is articulated in a self-locking manner to the first conveyor portion such that a self-acting displacement of the second conveyor portion relative to the first conveyor portion in the direction of the folded position is prevented.

7. The mobile material processing apparatus of claim 6, wherein:
- the first conveyor portion has a first center of mass on which a first weight force acts;
- the second conveyor portion has a second center of mass on which a second weight force acts;
- the tension element exerts a tension force on the tension connection, the tension force creating a moment with respect to the first swivel axis in equilibrium with a sum of moments of the first and second weight forces with respect to the first swivel axis; and
- at least when the second conveyor portion is in the unfolded conveying position a sum of a moment of the second weight force with respect to the second swivel axis and a moment of the tension force with respect to the second swivel axis is equal to zero or has a positive magnitude and is directed in a direction of swiveling of the second conveyor portion into the unfolded conveying position such that self-locking is achieved.

8. The mobile material processing apparatus of claim 7, wherein:

the second conveyor portion has a length in the direction of conveyance and the tension connection is spaced apart from the second swivel axis in the direction of conveyance by a distance no further than 30% of the length of the second conveyor portion.

9. The mobile material processing apparatus of claim 1, wherein:

the conveyor includes a folding mechanism including a folding actuator configured to move the second conveyor portion between the folded position and the unfolded conveying position.

10. The mobile material processing apparatus of claim 9, wherein:

the folding mechanism includes a lever, the lever being swivel coupled to the folding actuator by a first swivel bearing and the lever being swivel coupled to the second conveyor portion by a second swivel bearing, the second swivel bearing being spaced apart from the second swivel axis.

11. The mobile material processing apparatus of claim 10, wherein:

the folding mechanism includes a guide link swivel coupled to the first conveyor portion by a third swivel bearing and swivel coupled to the lever by a fourth swivel bearing, such that during a swiveling of the second conveyor portion about the second swivel axis the lever is guided relative to the first conveyor portion by the guide link such that the fourth swivel bearing moves in a circular path relative to the first conveyor portion.

12. The mobile material processing apparatus of claim 9, wherein:

the first conveyor portion includes a first underside; and the folding actuator is located below the first underside of the first conveyor portion.

13. The mobile material processing apparatus of claim 1, further comprising:

a machine frame;

wherein the base part is mounted on the machine frame such that the conveyor is swivelable relative to the machine frame about a third swivel axis between an operating position and a transport position; and wherein the third swivel axis forms an angle in a range of from 85° to 95° with the first swivel axis and the third swivel axis forms an angle of at most ±5° with vertical.

14. The mobile material processing apparatus of claim 13, further comprising:

a screening unit including a branch belt;

a feed hopper;

wherein in the operating position the pick-up area of the conveyor is located below the branch belt for receiving material from the screening unit, and the discharge area of the conveyor is located above the feed hopper for transferring received material to the feed hopper; and wherein in the transport position the conveyor is swiveled by at least 170° about the third swivel axis with respect to the operating position.

15. A method of adjusting a mobile material processing apparatus, the apparatus including a base part, a conveyor for conveying material in a direction of conveyance between a pick-up area and a discharge area of the conveyor, the conveyor being connected to the base part such that the conveyor may swivel about a first swivel axis relative to the base part, the conveyor including a first conveyor portion and a second conveyor portion connected together such that the second conveyor portion may swivel about a second swivel axis relative to the first conveyor portion between a folded position and an unfolded conveying position, and a tension element connected on one end to the base part and on another end to the second conveyor portion at a tension connection spaced apart from the first swivel axis and the second swivel axis, the method comprising:

swiveling the second conveyor portion about the second swivel axis relative to the first conveyor portion from the unfolded conveying position to the folded position such that a distance between the tension connection and the first swivel axis is reduced; and reducing an angle of inclination between the first conveyor portion and a horizontal plane as a result of reducing the distance between the tension connection and the first swivel axis during the swiveling.

16. The method of claim 15, further comprising:

swiveling the second conveyor portion about the second swivel axis relative to the first conveyor portion from the folded position to the unfolded conveying position such that the distance between the tension connection and the first swivel axis is increased; and increasing the angle of inclination between the first conveyor portion and the horizontal plane as a result of increasing the distance between the tension connection and the first swivel axis.

* * * * *